US 6,698,719 B2

United States Patent
Geiser

(10) Patent No.: US 6,698,719 B2
(45) Date of Patent: Mar. 2, 2004

(54) SEAL ARRANGEMENT FOR A VACUUM VALVE

(75) Inventor: Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 38 days.

(21) Appl. No.: 10/185,479

(22) Filed: Jun. 26, 2002

(65) Prior Publication Data

US 2004/0000659 A1 Jan. 1, 2004

(51) Int. Cl.$^7$ ............................................... F16K 57/00
(52) U.S. Cl. .................................... 251/332; 251/334
(58) Field of Search .............................. 251/332, 333, 251/334

(56) References Cited

U.S. PATENT DOCUMENTS

| | | | | |
|---|---|---|---|---|
| 3,540,695 A | * | 11/1970 | Taylor | ......................... 251/334 |
| 3,722,852 A | | 3/1973 | Powell et al. | |
| 4,208,035 A | | 6/1980 | Alvarez et al. | |
| 4,350,176 A | * | 9/1982 | Lace | ......................... 251/334 |
| 4,634,094 A | | 1/1987 | Geiser | |
| 5,188,017 A | * | 2/1993 | Grant et al. | ................. 251/332 |

FOREIGN PATENT DOCUMENTS

DE          35 33 937          12/1986

* cited by examiner

*Primary Examiner*—John Bastianelli
(74) *Attorney, Agent, or Firm*—Reed Smith LLP

(57) ABSTRACT

A seal arrangement for a vacuum valve with a valve body in which is arranged a valve opening having a longitudinal axis and which has an inner jacket surface surrounding the valve opening and forming a valve seat, and with a valve plate which closes the valve opening in the closed state of the vacuum valve and which has an outer jacket surface surrounding the valve plate, said inner jacket surface and said outer jacket surface being located opposite one another in the closed state of the valve. The seal arrangement comprises a sealing ring which is arranged in an annular groove arranged at the outer or inner jacket surface and which has groove flanks and a groove base, and a sealing surface which is provided at the inner or outer jacket surface and which has a conical shape relative to the longitudinal axis the valve opening and which is contacted by the sealing ring in the closed state of the vacuum valve. The distance of the groove base from the longitudinal axis of the valve opening changes along the width of the groove at least in the position occupied by the valve plate in the closed state of the vacuum valve and, further, a supporting ring is arranged in the groove laterally next to the sealing ring to limit the deformation of the sealing ring in the closed state of the vacuum valve, and when the groove is formed in the outer jacket surface of the valve plate this supporting ring is located on the side of the sealing ring on which the groove base has a greater distance from the longitudinal axis, and when the groove is formed in the inner jacket surface of the valve body this supporting ring is located on the side of the sealing ring on which the groove base has a smaller distance from the longitudinal axis. A side surface of the supporting ring facing the sealing ring, together with the portion of the groove base located next to the supporting ring and the adjoining groove flank, define a receiving space for the sealing ring contacting this side surface of the supporting ring and increase the width of this receiving space toward the groove base.

10 Claims, 3 Drawing Sheets

SEAL ARRANGEMENT FOR A VACUUM VALVE

BACKGROUND OF THE INVENTION

1. Field of the Invention

The invention is directed to a seal arrangement for a vacuum valve with a valve body in which is arranged a valve opening having a longitudinal axis and which has an inner jacket surface surrounding the valve opening and forming a valve seat, and with a valve plate which closes the valve opening in the closed state of the vacuum valve and which has an outer jacket surface surrounding the valve plate, said inner jacket surface and said outer jacket surface being located opposite one another in the closed state of the valve.

2. Description of the Related Art

Seal arrangements for vacuum valves of the kind mentioned above usually have a seal which is arranged at the valve plate and contacts a sealing surface provided at the valve seat of the valve body when closed. Occasionally, the sealing ring is also arranged at the valve seat and the sealing surface is provided at the valve plate, for example, when a particular cooling device is to be provided for the sealing ring.

Besides seal arrangements in which the sealing ring is arranged at the broad side of the valve plate, arrangements of the sealing ring at the narrow-side outer jacket surface of the valve plate are also known. In this case, the sealing surface and the jacket surface of the valve body have a conical shape. Such arrangements of the sealing ring and sealing surface can be provided, for example, in corner valves and are especially common in butterfly valves, as they are called.

Vacuum valves in the form of butterfly valves are known in different embodiment forms. In these butterfly valves, the valve plate is initially swiveled relative to the valve seat in order to open the valve and is then rotated by about 90° so that, when the valve opening is viewed from the end, only the narrow side of the valve plate is visible and the valve plate accordingly essentially releases the valve opening. Butterfly valves of this type are known in particular from U.S. Pat. No. 4,634,094 and German Patent DE 35 33 937 C1, whose contents are hereby adopted in the present application. A supporting shaft carrying a ball joint member which is supported in the housing so as to be swivelable on all sides is provided at the edge of the valve plate on one side and, in a diametrical arrangement, a connection part is provided on the other side. This connection part carries a pin which is guided in a link of an axially displaceable selector shaft or switching rod. The opening movement and closing movement of the valve plate is conveyed through an axial movement of the switching rod via this link. In the final phase of the closing movement shortly before the sealing ring is pressed against the sealing surface, the closing movement of the valve plate is approximately parallel to the valve opening.

Further, U.S. Pat. No. 3,722,852 discloses a seal arrangement in which a sealing ring, a sealing diaphragm and a supporting ring are provided at the valve plate. The sealing ring and the supporting ring are arranged in a depression surrounding the broad side of the valve plate in the area of its edge, and the supporting ring serves to limit the movement of the sealing plate relative to the valve seat in order to prevent jamming of the sealing diaphragm between the valve plate and a projection of the valve seat. The supporting ring is screwed to the valve plate and the sealing ring is connected to the supporting ring by a positive engagement.

The seal arrangement known from U.S. Pat. No. 4,208,035 has a one-piece seal element which is provided with a sealing ring arranged at the free end of a spring arm. A supporting portion of the sealing element is provided for limiting the deflection of the sealing ring through the valve plate in the closed state of the valve, this Supporting portion being ring-shaped as a whole. This metal seal element forming the valve seat is welded to the valve body.

OBJECT AND SUMMARY OF THE INVENTION

One object of the invention is to provide a seal arrangement which can be used advantageously in a valve of the type mentioned above and in which the pressing of the sealing ring is limited in the closed state of the valve. A further object of the invention consists in providing a seal arrangement for a vacuum valve of the type mentioned in the beginning which can be assembled and, if required, also disassembled in a simple manner. It is a further object of the invention to provide a seal arrangement for a vacuum valve of the type mentioned in the beginning in which the pressing of the sealing ring is limited in the closed state of the valve and in which only comparatively few particles are released into the vacuum when closing and opening the valve and whose production costs are relatively low.

A seal arrangement, according to the invention, for a vacuum valve of the type mentioned in the beginning comprises:

a sealing ring which is arranged in an annular groove arranged at the outer or inner jacket surface and which has groove flanks and a groove base, a sealing surface which is provided at the inner or outer jacket surface and which has a conical shape relative to the longitudinal axis of the valve opening and which is contacted by the sealing ring in the closed state of the vacuum valve, wherein the distance of the groove base from the longitudinal axis of the valve opening changes along the width of the groove at least in the position occupied by the valve plate in the closed state of the vacuum valve and, further, a supporting ring is arranged in the groove laterally next to the sealing ring to limit the deformation of the sealing ring in the closed state of the vacuum valve, and when the groove is formed in the outer jacket surface of the valve plate this supporting ring is located on the side of the sealing ring on which the groove base has a greater distance from the longitudinal axis, and when the groove is formed in the inner jacket surface of the valve body this supporting ring is located on the side of the sealing ring on which the groove base has a smaller distance from the longitudinal axis, and wherein a side surface of the supporting ring facing the sealing ring, together with the portion of the groove base located next to the supporting ring and the adjoining groove flank, define a receiving space for the sealing ring contacting this side surface of the supporting ring and increase the width of this receiving space toward the groove base.

Due to the fact that the groove base increases or decreases along the width of the groove, the supporting ring which is generally made from a material with little or no ductility or compressibility and/or from a material with little or no deformability can be inserted easily into the groove. The supporting ring requires little or no ductility or compressibility and/or little or no deformability while nevertheless contacting the base of the groove in the inserted state. The sealing ring can subsequently be inserted into the receiving space which is formed when the supporting ring is installed. Because of the increase in width in the receiving space toward the base of the groove, it is possible to snap the sealing ring into this receiving space and/or a free space remains in the installed state of the sealing ring and the material of the sealing ring can be pressed into this free space when the sealing ring is pressed against the sealing surface.

The various features and developments according to the invention are given in the claims.

Further advantages and details of the invention are mentioned in the following with reference to the embodiment examples shown in the drawing and further objects of the invention follow therefrom.

DESCRIPTION OF THE PREFERRED EMBODIMENTS

Figure 1:
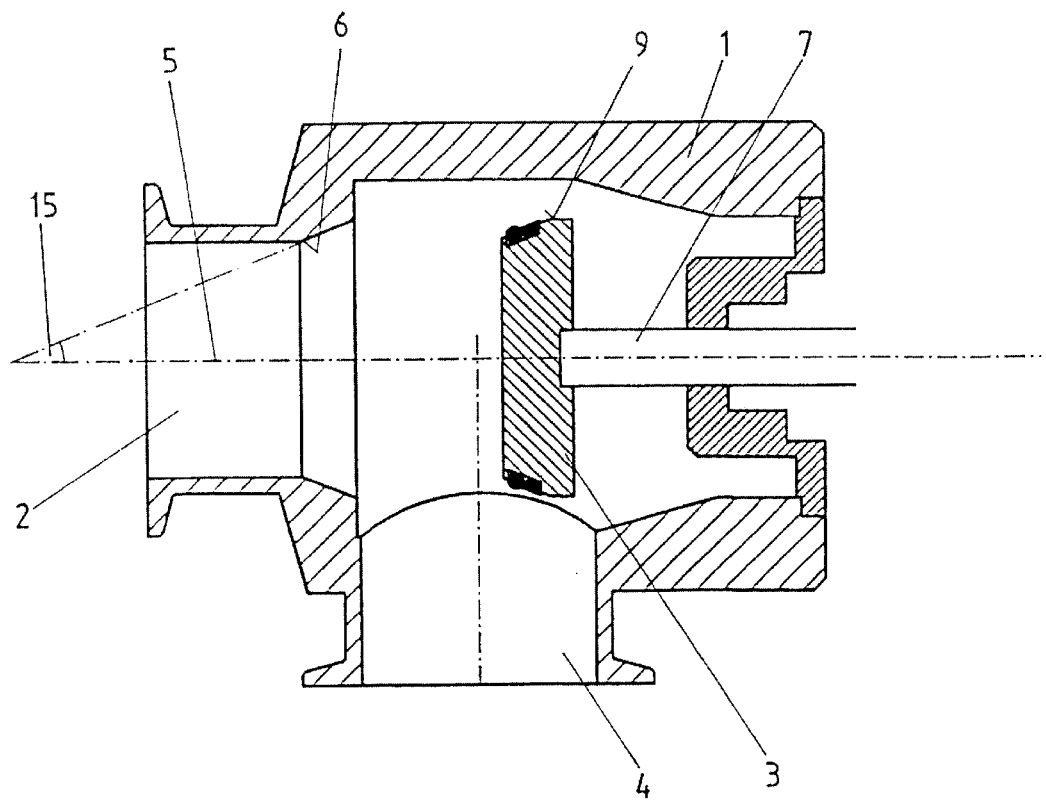
FIG. 1 shows a schematic longitudinal center section through a vacuum valve in the form of a corner valve having a seal arrangement according to the invention, in the opened state of the valve.
Figure 2:
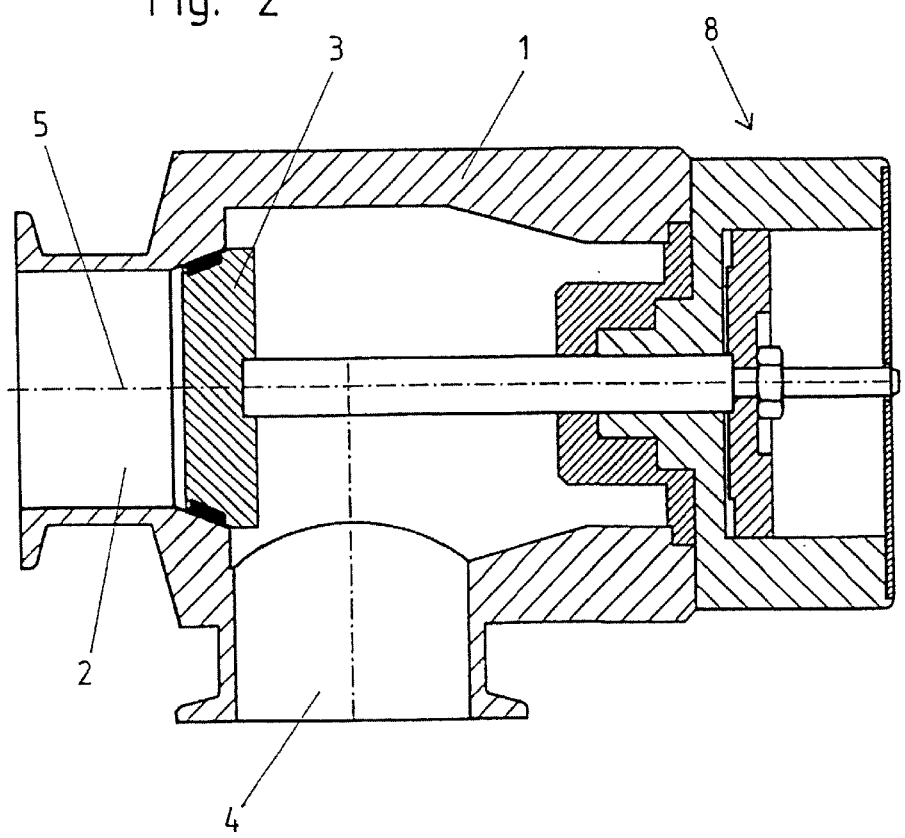
FIG. 2 shows the vacuum valve of FIG. 1 in the closed state.

The vacuum valve shown in FIGS. 1 and 2 in the form of a corner valve has a valve body 1 which is constructed as a housing and which is provided with a valve opening 2 that can be closed by a valve plate 3. Another opening 4 is provided in the valve body 1, the longitudinal axis of this opening 4 being oriented vertical to the longitudinal axis 5 of the valve opening 2. An inner jacket surface 6 of the valve body 1 which surrounds the valve opening 2 forms a valve seat for the valve plate 3.

The valve plate 3 is secured to a valve rod 7 which is guided out of the valve body 1 through a linear leadthrough. In order to open and close the valve, the valve rod 7 is displaceable in direction of the longitudinal axis 5 of the valve opening 2 by means of an actuating device 8 which is shown only schematically in FIG. 2 and can be formed, for example, of a piston-cylinder unit.

In its narrow side or outer jacket surface 9, the valve plate 3 has a groove 10 which surrounds the valve plate 3 annularly. This groove 10 is formed by a left and right groove flank 11, 12 and a groove base 13 (FIG. 3) and has a width w (FIG. 4). The distance of the groove base 13 from the longitudinal axis 5 of the valve opening 2 changes along the width of the groove and is smaller on the side of the groove 10 facing the valve opening 2 than on the side of the groove 19 facing away from the valve opening 2. According to FIGS. 1 to 4, the groove base 13 extends conically relative to the longitudinal axis 5 of the valve opening 2, for example, in the shape of a conical jacket surface.

A sealing ring 14 is arranged in the groove 10 and, in the closed state of the valve, contacts the sealing surface formed by the inner jacket surface 6 of the valve body 1. This sealing surface encloses an angle 15 with the longitudinal axis 5 of the valve opening 2 that is greater than the groove and less than 90°, i.e., it is conically shaped. The angle 15 can be between 15° and 45°.

Also, in this embodiment example a trapezoidal supporting ring 16 is arranged in the groove 10. In the closed state of the valve, this supporting ring 16 limits the pressing or deformation of the sealing ring 14 as can be seen from FIG. 4. The supporting ring 16 is arranged on that side of the sealing ring 14 inside the groove on which the groove base 13 has a greater distance from the longitudinal axis 5 of the valve opening 2. The distance from the outer jacket surface 9 to the longitudinal axis 5 in the area facing the valve opening 2 next to the groove 10 is no greater than or only slightly greater (i.e., a few percent of the distance from the longitudinal axis) than the distance of the groove base 13 from the longitudinal axis 5 in the area of the groove base 13 in which the supporting ring 16 contacts the latter in the installed state. Therefore, the supporting ring 16 can be inserted into the groove 10 before the insertion of the sealing ring 14 without any expansion or with only slight expansion of the supporting ring 16.

Figure 3:
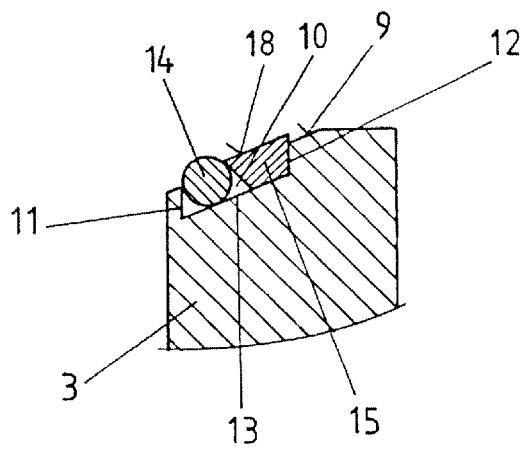
FIG. 3 shows an enlarged section from FIG. 1 in the area of the groove in the outer jacket surface of the valve plate.
Figure 4:
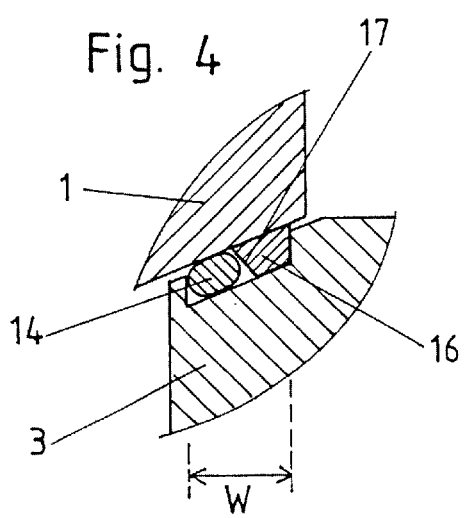
FIG. 4 shows an enlarged section from FIG. 2 in the area of the groove in the outer jacket surface of the valve plate and of the valve seat.

When the supporting ring 15 is inserted into its predetermined position, a receiving space is formed for the sealing ring 14, this receiving space being defined by the side surface 17 of the supporting ring 16 facing the sealing ring 14, by the portion of the groove base 13 located next to the supporting ring 16, and by the groove flank 11 located on the left-hand side with reference to FIGS. 3 and 4. This receiving space for the sealing ring has a width which increases toward the groove base, so that it has the shape of an undercut groove in which the sealing ring 14 is subsequently inserted. The sealing ring 14 can be snapped into this receiving space accompanied by slight elastic deformation. Further, this receiving space which widens toward the groove base creates a space remaining open after the sealing ring is inserted but not yet deformed, wherein the sealing ring can be pressed into this space at least partially in the closed state of the valve in order to receive the material deformation of the sealing ring (FIG. 4).

Accordingly, in the state in which both the sealing ring and the supporting ring are inserted into the groove, the sealing ring 14 is held in its predetermined position in the groove by the supporting ring 16 on the one hand and the supporting ring 16 is supported by the sealing ring 14 on the other hand and therefore can not slip into an area of the groove from which it could fall out of the groove.

The sealing ring can be made of a suitably elastic material commonly used for vacuum sealing rings, for example, Viton®. The supporting ring 16 comprises a comparatively less elastic and harder material. In order to fulfill its function, it is also as little plastically deformable as possible. For example, the supporting ring can comprise PTFE, with or without filler, or can be made of another suitable plastic. Metals which release only few particles into the vacuum when contacting the valve body 1, particularly oxidized metals, are also possible. Further, it is also conceivable and possible to use ceramics. The frictional pairing of the external surface 18 of the sealing ring 14 and the inner jacket surface 6 of the valve body should generate as few particles as possible and should have a sufficiently small coefficient of friction. The friction angle of the surface 18 of the supporting ring in relation to the inner jacket surface 6 should advantageously be less than the angle 15 enclosed by the inner jacket surface 6 and the longitudinal axis 5. By friction angle is meant the angle at which the adhesive friction of a frictional pairing is overcome when the applied force, proceeding vertically, acts at an increasingly flatter angle.

Figure 5:
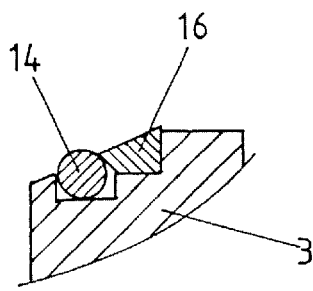
FIGS. 5 and 6 show additional embodiment forms of the invention in a view corresponding to FIG. 3.

As is shown in FIG. 5, it is also conceivable and possible to provide a stepped groove base 13 instead of a conical groove base 13. The supporting ring 16 is located on the higher step and the sealing ring 14 is located on the lower step.

Figure 6:
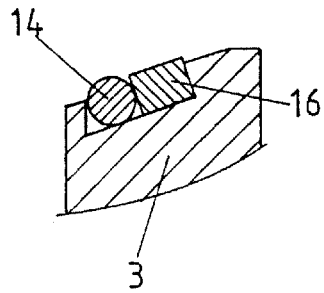

In the embodiment example shown in FIG. 6, the supporting ring 16 has a rectangular cross-sectional shape. In this case, the receiving space for the sealing ring 14 has an undercut on one side only.

Other shapes of the groove base are also conceivable and possible, for example, with a trough-shaped recess in the area of the sealing ring.

Figure 7:
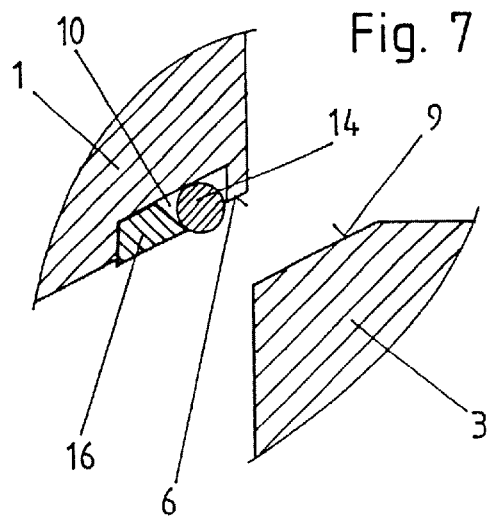
FIG. 7 shows another embodiment example of the invention in which the sealing surface is arranged at the valve plate and the sealing ring and supporting ring are arranged at the valve seat.

FIG. 7 shows an embodiment example in which the groove 10, with sealing ring 14 and supporting ring 16 arranged therein, is arranged in the valve seat, that is, in the inner jacket surface 6 of the valve body 1, the sealing surface being provided at the outer jacket surface 9 of the valve plate 3. In this case, the supporting ring 16 is located on the side of the groove 10 on which the groove base 13 is at a smaller distance from the longitudinal axis 5 of the valve opening. The supporting ring 16 can accordingly be inserted in the groove 10 without, or with only slight, upsetting and/or deformation. For this purpose, in the area lateral to the groove on the side facing the valve plate 3, the inner jacket surface 6 has a distance from the longitudinal axis 5 which is not less than or is only slightly less (i.e., a few percent of the distance from the longitudinal axis) than the distance of the groove base 13 from the longitudinal axis in the area provided for the contact of the supporting ring 16.

Figure 8:
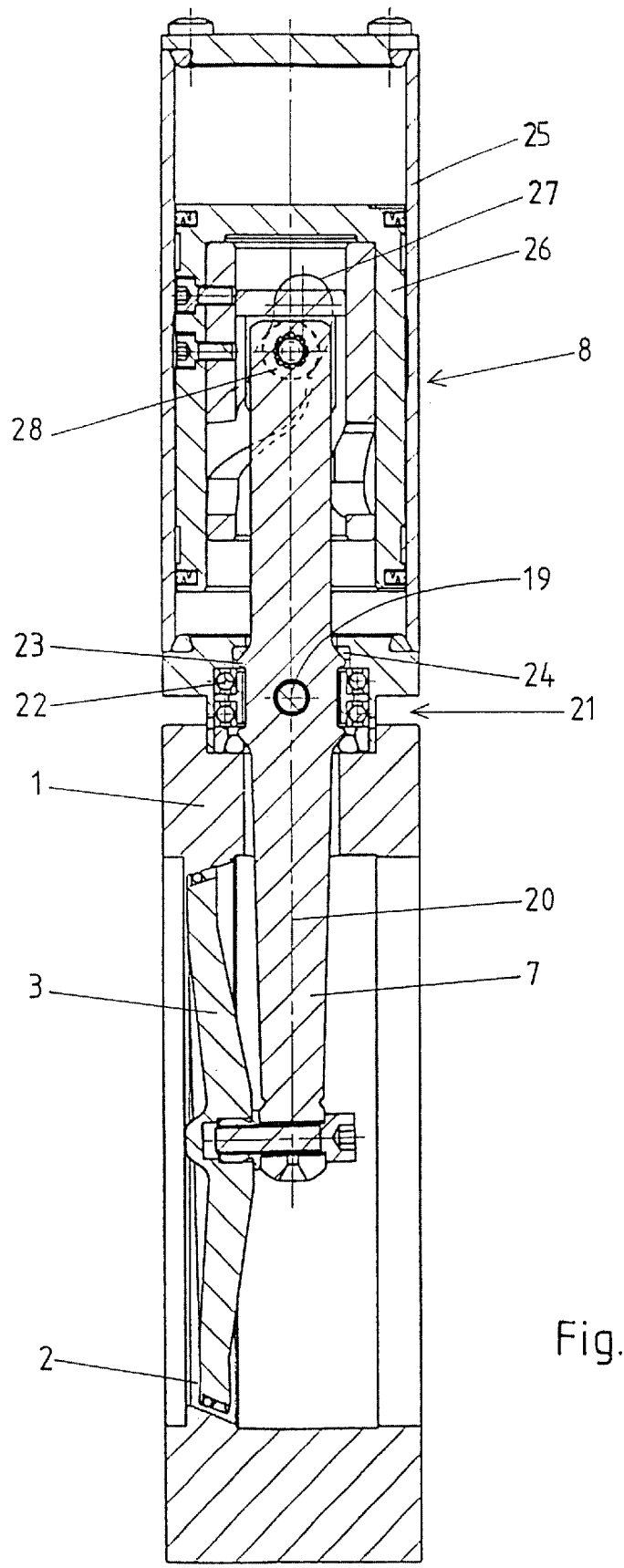
FIG. 8 shows a longitudinal center section through a butterfly valve with a seal arrangement according to the invention.

A seal arrangement according to the invention can also be used for other valve constructions and valve types, particularly for butterfly valves, for example, such as those known from the prior art cited in the introductory part of the specification. An embodiment form of a butterfly valve with a seal arrangement according to the invention is shown in FIG. 8. Analogous parts are provided with the same reference numbers. A valve plate 3 is secured to a valve rod 7 and closes a valve opening 2 in the closed state of the valve. In order to open the valve proceeding from the position shown in FIG. 8, the valve rod 7 is first swiveled about the axis 19 vertical to the drawing plane and is then rotated about its longitudinal axis 20. For this purpose, the valve rod 7 is guided out of the valve body 1 by a rotating-tilting leadthrough 21. For rotation about the longitudinal axis 20, this rotating-tilting leadthrough 21 has a ball bearing 22 in which the pin forming the axis of rotation 19 is supported. For tilting, projections 23 forming spherical surface portions are formed at the valve rod 7 and are sealed by sealing rings 24. An actuating device 8 comprising a piston 26 which is displaceable in a cylinder 25 is provided for carrying out the rotating-tilting movement. A link 27 in which guide rollers 28 which are rotatably supported at the valve rod 7 engage is secured to the piston 26 so that the rotating-tilting movement is guided.

As will follow from the preceding description, the field of the invention is not limited to the embodiment example shown herein, but should be defined with reference to the appended claims together with their full range of possible equivalents. While the invention is shown by the preceding description and the drawings, it will be apparent to the person skilled in the art that different changes can be carried out without departing from the true spirit and field of the invention.

While the foregoing description and drawings represent the present invention, it will be obvious to those skilled in the art that various changes may be made therein without departing from the true spirit and scope of the present invention.

Reference numbers 1 valve body
2 valve opening
3 valve plate
4 opening
5 longitudinal axis
6 inner jacket surface
7 valve rod
8 actuating device
9 outer jacket surface
10 groove
11 groove flank
12 groove flank
13 groove base
14 sealing ring
15 angle
16 supporting ring
17 side surface
18 surface
19 axis
20 longitudinal axis
21 rotating-tilting leadthrough
22 ball bearing
23 projection
24 sealing ring
25 cylinder
26 piston
27 link
28 guide roller

What is claimed is:

1. A seal arrangement for a vacuum valve with a valve body in which is arranged a valve opening having a longitudinal axis and which has an inner jacket surface surrounding the valve opening and forming a valve seat, and with a valve plate which closes the valve opening in the closed state of the vacuum valve and which has an outer jacket surface surrounding the valve plate, said inner jacket surface and said outer jacket surface being located opposite one another in the closed state of the valve, the seal arrangement comprising:

a sealing ring which is arranged in an annular groove arranged at the outer or inner jacket surface and which has groove flanks and a groove base;

a sealing surface which is provided at the inner or outer jacket surface and which has a conical shape relative to the longitudinal axis of the valve opening and which is contacted by the sealing ring in the closed state of the vacuum valve;

wherein the distance of the groove base from the longitudinal axis of the valve opening changes along the width of the groove at least in the position occupied by the valve plate in the closed state of the vacuum valve and, further, a supporting ring is arranged in the groove laterally next to the sealing ring to limit the deformation of the sealing ring in the closed state of the vacuum valve, and when the groove is formed in the outer jacket surface of the valve plate, said supporting ring is located on the side of the sealing ring on which the groove base has a greater distance from the longitudinal axis, and when the groove is formed in the inner jacket surface of the valve body, said supporting ring is located on the side of the sealing ring on which the groove base has a smaller distance from the longitudinal axis; and wherein a side surface of the supporting ring facing the sealing ring, together with the portion of the groove base located next to the supporting ring and the adjoining groove flank, define a receiving space for the sealing ring contacting this side surface of the supporting ring and increase the width of this receiving space toward the groove base.

2. The seal arrangement according to claim 1, wherein the friction angle of an outer surface of the supporting ring remote of the groove base is, in relation to the sealing surface, less than the angle enclosed by the sealing surface with the longitudinal axis of the valve opening.

3. The seal arrangement according to claim 1, wherein the material of the supporting ring is harder than the material of the sealing ring.

4. The seal arrangement according to claim 1, wherein the supporting ring can be inserted into the groove with no expansion.

5. The seal arrangement according to claim 1, wherein the supporting ring can be inserted into the groove with no upsetting.

6. The seal arrangement according to claim 1, wherein the supporting ring can be inserted into the groove with no deformation.

7. The seal arrangement according to claim 1, wherein the groove base is parallel to the sealing surface.

8. The seal arrangement according to claim 1, wherein the groove base is stepped and the supporting ring rests on one of the steps and the sealing ring rests on another of the steps.

9. The seal arrangement according to claim 1, wherein the supporting ring is trapezoidal in cross section.

10. The seal arrangement according to claim 1, wherein the seal is constructed as an O-ring.

* * * * *